United States Patent [19]

Stapleton

[11] 4,338,627
[45] Jul. 6, 1982

[54] LED/CCD MULTIPLEXER AND INFRARED IMAGE CONVERTER

[75] Inventor: John J. Stapleton, East Brunswick, N.J.

[73] Assignee: International Telephone and Telegraph Corporation, New York, N.Y.

[21] Appl. No.: 144,519

[22] Filed: Apr. 28, 1980

[51] Int. Cl.³ .............................................. H04N 7/18
[52] U.S. Cl. .................................... 358/113; 358/213; 358/901
[58] Field of Search ........................ 358/113, 901, 213

[56] References Cited

U.S. PATENT DOCUMENTS 3,626,091 12/1971 Casper ................................. 358/113
3,628,080 12/1971 Lindeqvist .......................... 358/901
4,064,533 12/1977 Lampe ................................ 358/113
4,091,414 5/1978 Chow ................................. 358/113
4,121,248 10/1978 Coale .................................. 358/113

Primary Examiner—Howard Britton
Attorney, Agent, or Firm—John T. O'Halloran; Peter C. Van Der Sluys

[57] ABSTRACT

A device for providing scan conversion, integration and parallel to serial conversion in one modular element which comprises an array of infrared detectors, amplifiers and LEDs, with said LEDs optically coupled to a CCD sensor which provides an output which may be utilized for image reconstruction. A feed back gain channel connected to the output of said sensor serves to provide a reference which controls the steady state amplitude of all the LEDs thereby stabilizing the LED array.

19 Claims, 2 Drawing Figures

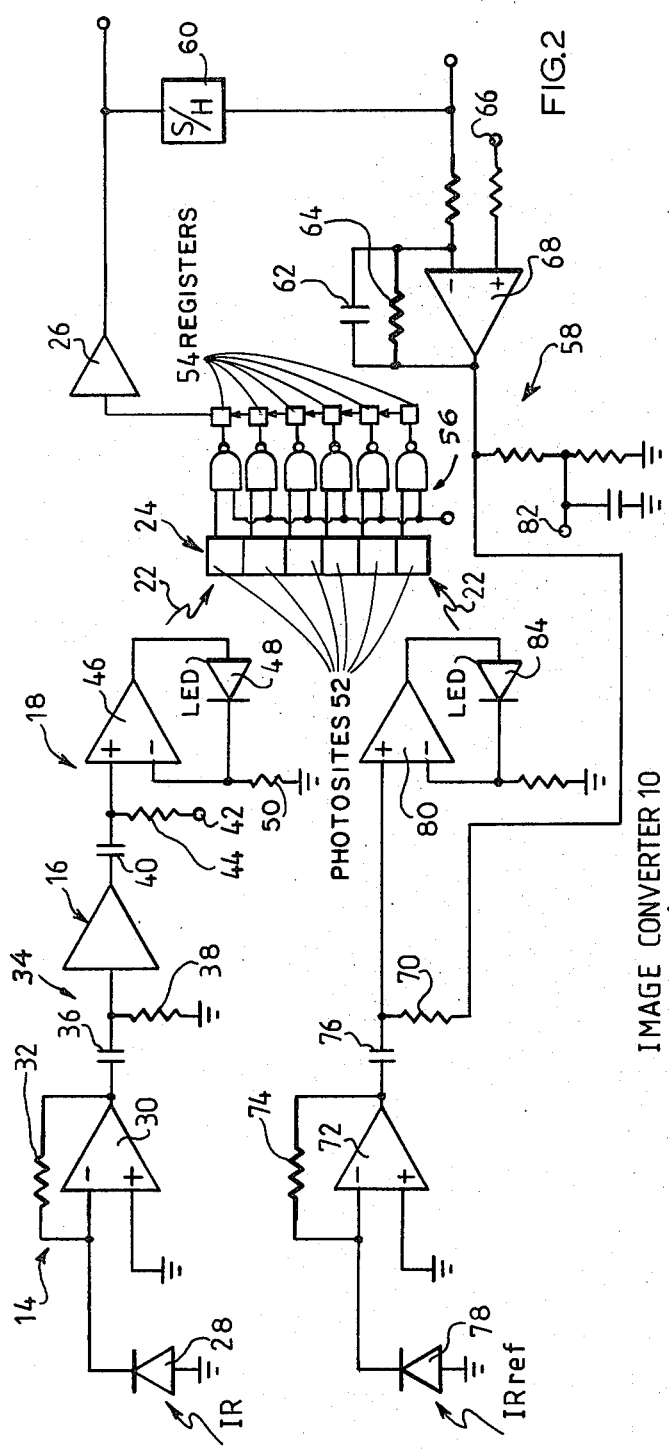
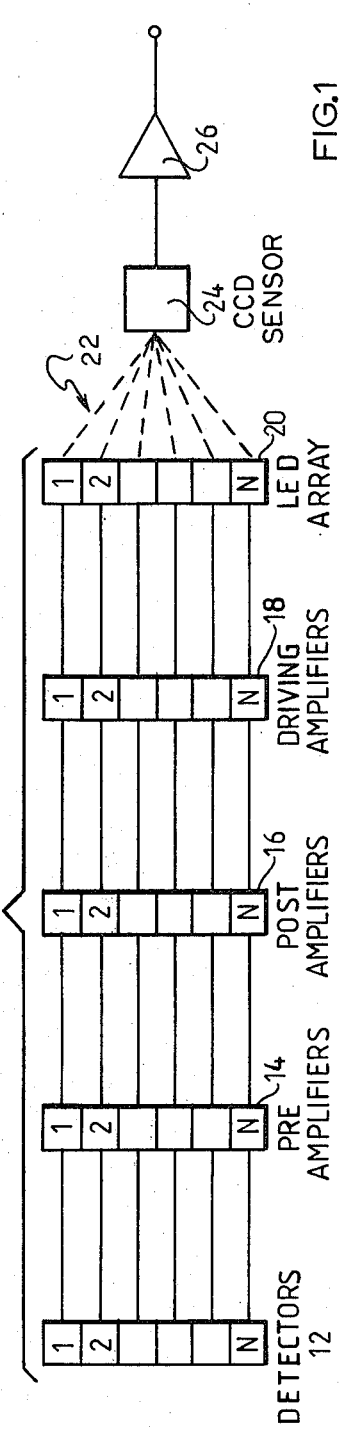
FIG.1
FIG.2

LED/CCD MULTIPLEXER AND INFRARED IMAGE CONVERTER

FIELD OF THE INVENTION

The present invention relates to infrared image conversion and improvements thereon.

BACKGROUND OF THE INVENTION

There presently exists many arrangements which provide for conversion of infrared radiation into electrical signals used to create images. This usually involves detector elements in an array whose outputs vary proportional to the infrared power collected. This output in turn is used to modulate a corresponding light emitting array or a cathode ray tube with the brightness of the elements of the array varying with the radiance of the infrared scene.

The output of these elements may then be relayed to the operator's eye possibly by a prismatic arrangement or to a cathode ray tube as described in U.S. Pat. No. 3,626,091 granted Dec. 7, 1971, or to some other image producing means. To increase the application of such systems, it is desirable to improve their operations and utilize high density arrays in the processing of the signals, due to their efficiency and high density packing. However, in such systems it is necessary that the output of the detector is effectively utilized and coupled with the array and that temperature effects on the system be, minimized. Also, in high density packing, it is necessary that the sensitive infrared detectors be protected from free radiation and EMI that may effect the systems efficiency.

SUMMARY OF THE INVENTION

It is an object of the invention to provide for effective coupling of an LED array to a CCD array, while optically isolating infrared detectors, and eliminate the temperature effect on the detectors.

A further object is to provide parallel to serial conversion of analog signals from the detectors to provide video for remote viewing or image processing with wide dynamic range of operation and to reduce noise interference.

A yet further object is to provide integration between samples of the signals from the detectors, to provide high signal to noise ratio and to reduce the temperature effects on the system.

A still further object is to provide that all of the foregoing objects are achieved in a single modular element.

The present invention provides for an array of detectors sensitive to infrared radiation, providing an output signal in its presence. This signal is then stabilized and integrated by pre and post amplifiers and is then used to linearly modulate it through an LED array. This array is then close coupled to a fiber optic bundle which directs the LED radiation to individual photosites of a CCD sensor.

At a predetermined interval, the stored charges at each photosite is transferred to a CCD shift register and then shifted out to be utilized in image reconstruction.

To compensate for temperature effects which may effect the output of the LED array, a feed back gain channel serves to provide a reference which serves to control steady state amplitude of all the LEDs, stabilizing the LED array.

Thus by the present invention, the above mentioned objects and advantages are realized, which is in addition to other objects and advantages that will become apparent from the description herein which is to be taken in conjunction with the accompanying drawings.

BRIEF DESCRIPTION OF THE DRAWINGS

FIG. 1 is a block diagram of the image converter and the CCD array incorporating the teachings of this invention.

FIG. 2 is a schematic representation of the image converter and CCD array utilizing a feed back gain channel reference, incorporating the teachings of this invention.

DETAILED DESCRIPTION OF THE DRAWINGS

With reference now to FIG. 1, there is provided a general over view of the system in block diagram representing the elements of the present system. The first stage of the infrared image converter 10 includes a plurality of infrared detectors in an array 12, with N indicating the total number of detectors in the system, which may vary as desired. These detectors 12 are sensitive to infrared radiation and provide an electrical output which will vary proportionally to the infrared power collected. The signal for each detector is then integrated via preamplifiers 14 and post amplifiers 16, and the output of the post amplifier is used to linearly modulate the current through an LED array 20 via driving amplifiers 18, over a range beyond 20 microamps to 20 milliamps.

The LED array 20 is then close coupled to a fiber optic bundle 22 which directs the LED radiation to individual photosites of a silicon linear CCD sensor 24. By the use of the fiber optic coupling, the infrared detectors 12 are optically isolated from any radiation or EMI that might occur in the transfer of the LED radiation to the photosites of the CCD sensor, thereby allowing for more efficient operation. The coupling of the fiber optic may be similar to that discussed with regard to junction lasers disclosed in an article by Cohen and Schneider entitled Microlenses for Coupling Junction Lasers to Optical Fibers, in the periodical Applied Optics, Vol. 13, No. 1 January, 1974, if so desired, or any other means of effectively coupling the same. Accordingly, a demagnifying lens should have high resolution (modulation transfer function) and wide aperture to minimize cross talk and maximize efficiency.

At a predetermined interval, e.g., every 6 microseconds, the stored charges are shifted out of the CCD sensor and amplified 26 as desired, and then used in image reconstruction.

A more detailed representation of the system for an individual infrared detector 12 is shown schematically in FIG. 2 which is represented by an infrared sensitive diode 28. The output of the diode 28 is connected to the preamplifier 14 by way of the inverting terminal of amplifier 30, having its noninverting terminal to ground. A feed back resistor 32 is provided between the output of amplifier and its inverting terminal and has a high impedance in the order of 10 M ohms.

The amplifier output is connected to a high pass filter 34 comprising capacitor 36 and resistor 38 connected to ground. This in turn is fed into a post amplifier 16 which provides an output which will be useful for generating an external control signal. Capacitor 40 serves as a DC decoupler, and with DC biasing of the driving amplifier 18 being provided at terminal 42 via resistor 44 which connects to the noninverting input of amplifier 46. The output of the post amplifier is used to linearly modulate the current through an LED 48 beyond the range of 20 microamps to 20 milliamps. This is accomplished by amplifier 46 which has its output connected to the input of the LED 48, whose output in turn connects to the inverting input of the amplifier 46 and a resistor 50 to ground.

As aforementioned, each of the LED 48 in the LED array is close coupled to a fiber optic bundle 22 which directs the LED radiation to individual photosites 52 of a silicon linear CCD sensor. The number of photosites would correspond respectively to the number of infrared detectors. This effectively transfers the LED radiation to the photosites without causing free radiation or EMI which might influence the detector array 12.

At a preset time interval, e.g. every 6 microseconds, the stored LED radiation that is integrated on each photosite is transferred simultaneously to a CCD shift register 54, indicated by the AND gate 56 arrangement shown separate, but is actually part of the CCD. These elements permit the CCD to integrate the LED signal between samples, rather than during the very narrow aperture time of most multiplexers. These are in turn then shifted out as a video bit stream at a preset rate e.g. 11 MHz and amplified as desired via amplifier 26, whose output is used in image reconstruction, analysis, display etc.

In addition, the output of amplifier 26 is tapped into by an additional channel 58 which serves as a feed back gain reference and is used to stabilize the entire array. The operation of the additional channel might be compared to the DC restoration in TV camera tubes which sample the detector dark current during horizontal blanking or scene reference amplitude and restore the quiescent value.

This additional channel is demultiplexed from the combined serial video waveform output of amplifier 26 via a sample and hold circuit 60. It is desired that the waveform sampling rate be in accordance with the Nyquist criteria which would require multiplexing clock frequency of $f_c = 2 f_0 N$. Where $f_0$ is the highest harmonic of the signal, (10.4 KHz) and N is the number of multiplexed channels. For improved signal fidelity, more than two samples should be taken. The number of samples required to accurately determine the peak values of the cosine and cosine-squared functions of the signals are tabulated as follows:

| Number Sample/Pulse | WORST CASE PEAK VALUE | | AVERAGE PEAK VALUE | |
|---|---|---|---|---|
| | $Cos^2 t$ | $Cos\ t$ | $Cos^2 t$ | $Cos\ t$ |
| 2 | 0 | 0 | 0.5 | 0.707 |
| 4 | 0.5 | 0.707 | 0.8536 | 0.9239 |
| 8 | 0.8536 | 0.9239 | 0.9619 | 0.9808 |
| 16 | 0.9619 | 0.9808 | 0.9904 | 0.9952 |

These waveforms approximate the signal produced when the infrared detector scans a point source of radiation. At ten samples, the error is 10% for the $cos^2 t$ and for less than a 5% error, if desired, 16 samples are required. The number of samples may be varied as the design parameters for the individual system dictates, however, the use of 16 sample/pulses is preferred.

The signal from the sample and hold circuit is filtered via capacitor 62 and resistor 64 and compared with a voltage signal, applied at terminal 66, by an operational amplifier 68. This applied voltage may be adjusted as desired, such as by a brightness potentiometer. The operational amplifier 68 has sufficient open loop gain that a large gain determined resistor 64 can provide better than 0.1° C. temperature stability and sensitivity for NET (noise equivalent temperatures) sensing 300° K. backgrounds. The output of amplifier 68 is connected via resistor 70 with the output of amplifier 72 having feedback resistor 74, via DC decoupler capacitor 76. A light sensitive diode 78 is provided and is sensitive to infrared radiation, providing an output in its presence. The diode 78 is exposed to a known amount of infrared radiation which is used as a reference signal to stabilize the system. This infrared reference signal at 78 and input voltage 66 can be under computer or manual control as aforementioned for optimizing the dynamic range as well as temperature stability of the system.

The output of diode 78, in response to the reference radiation, is fed into the inverting terminal of amplifier 72 whose output is connected with the output of amplifier 68 and fed into driving amplifier 80. An increase of IR or temperature drift on 78 will increase the voltage into 80 which increases the light from 84 onto the CCD and hence the output voltage from 26 which is sampled at the appropriate time and held by 60. This decreases the voltage output of 68 and cancels the original increase into 80 so the difference voltage into 68 is nulled. Biasing of amplifier 80 and 46 may be provided by an average input at terminal 82 and 42. The amplifier 80 which receives the signal from amplifiers 72 and 68, serves to drive an LED 84 which in turn is connected to the CCD sensor array 24 via fiber optic bundle 22, close coupled to a photosite of the CCD as previously discussed. All the channels can be controlled by jumpering terminals 82 to 42 or each channel can be adaptively controlled by separate inputs to 42. The signals from amplifiers 68 and 72 serve to control the steady state amplitude of all the LEDs and thereby eliminating the temperature effect on the system.

The foregoing arrangement provides for a scan conversion, integration and parallel to serial conversion in one modular element and although a preferred embodiment of the invention has been disclosed and described in detail herein, its scope should not be limited thereby, but rather its scope should be determined by that of the appended claims.

What is claimed is:

1. A device for irradiation detection and image conversion which comprises:
    at least one irradiation detector means capable of providing an output in the presence of said irradiation with said output proportional to the level of said irradiation;
    at least one light emitting means coupled to a respective detector means and adapted to emit a signal responsive to the output of said detector means;
    at least one optical fiber for each respective emitting means coupled to said emitting means at one end;
    sensor coupled to said fiber at its other end; and
    said sensor being capable of receiving and storing as data the signal received from each emitting means and provide an output therefrom at predetermined intervals which may be used for image reconstruction.

2. The device in accordance with claim 1 which further includes a driving means for each light emitting means, with said driving means capable of receiving the output from a detector means and using it to modulate an emitting means over a predetermined range.

3. The device in accordance with claim 2 wherein said range is typically 20 milliamps to 20 microamps.

4. The device in accordance with claim 1 wherein the emitting means is of the LED type.

5. The device in accordance with claim 2 which further includes a preamplifier and post amplifier for each emitting means interposed between the detector means and the driving means and coupled thereto and said pre and post amplifiers are capable of stabilizing and integrating the output of the detector means.

6. The device in accordance with any of the claims 1 through 5 wherein the sensor is of the CCD type having a respective photosite close coupled with a respective emitting means via an optical fiber and capable of storing the signal therefrom as data, and said sensor is capable of shifting out said data at a predetermined rate.

7. The device in accordance with claim 6 wherein said data is shifted out at a video rate.

8. The device in accordance with any of claims 1–5 which further includes a feed back channel coupled to the output of the sensor wherein said channel controls the steady state amplitude of the emitting means.

9. The device in accordance with claim 8 wherein said channel includes: a sample and hold circuit which serves to demultiplex the output from the sensor; and a comparator means coupled thereto capable of comparing the signal to a reference signal to provide a difference signal which is used to control the steady state amplitude of the emitting means.

10. The device in accordance with claim 6 which further includes a feed back channel coupled to the output of the sensor wherein said channel controls the steady state amplitude of the emitting means.

11. The device in accordance with claim 10 wherein said channel includes: a sample and hold circuit which serves to demultiplex the output from the sensor; and a comparator means coupled thereto capable of comparing the signal to a reference signal to provide a difference signal which is used to control the steady state amplitude of the emitting means.

12. The device in accordance with claim 11 wherein said data is shifted out at a video rate.

13. A device for irradiation detection and image conversion which comprises:

at least one irradiation detector means capable of providing an output in the presence of said irradiation with said output proportional to the lever of said irradiation;

at least one light emitting means coupled to a respective detector means and adapted to emit a signal responsive to the output of said detector means;

at least one optical fiber for each respective emitting means coupled to said emitting means at one end;

sensor coupled to said fiber at its other end and capable of receiving and storing as data the signal received from each emitting means and provide an output therefrom at predetermined intervals which may be used for image reconstruction; and feedback channel coupled to the output of the sensor with said channel including: sample and hold circuit which is capable of demultiplexing the output from the sensor and provide a sample signal; and comparator means coupled to the sample and hold circuit and capable of comparing the sample signal to a reference signal to provide a difference signal which is used to control the steady state amplitude of the emitting means.

14. The device in accordance with claim 13 which further includes a driving means for each light emitting means, with said driving means capable of receiving the output from a detector means and using it to modulate an emitting means over a predetermined range.

15. The device in accordance with claim 14 wherein said range is typically 20 milliamps to 20 microamps.

16. The device in accordance with claim 13 wherein the emitting means is of the LED type.

17. The device in accordance with claim 14 which further includes a preamplifier and post amplifier for each emitting means interposed between the detector means and the driving means and coupled thereto and said pre and post amplifiers are capable of stabilizing and integrating the output of the detector means.

18. The device in accordance with any of the claims 13 through 17 wherein the sensor is of the CCD type having a photosite for each emitting means capable of storing the signal therefrom as data, and said sensor is capable of shifting out said data at a predetermined rate.

19. The device in accordance with claim 18 wherein said data is shifted out at a video rate.

* * * * *